United States Patent [19]
Henderson et al.

[11] Patent Number: 5,272,571
[45] Date of Patent: Dec. 21, 1993

[54] STENOTYPE MACHINE WITH LINKED AUDIO RECORDING

[75] Inventors: Lionel A. Henderson, Los Angeles; Lester R. Linn, Jr., La Crescenta; Louise K. Mizota, Santa Barbara, all of Calif.

[73] Assignee: L. R. Linn and Associates, Los Angeles, Calif.

[21] Appl. No.: 744,099

[22] Filed: Aug. 13, 1991

[51] Int. Cl.$^5$ .............................................. G11B 5/00
[52] U.S. Cl. ............................................ 360/4; 178/21
[58] Field of Search ............ 360/4, 13; 364/409; 178/21, 17.5

[56] References Cited

U.S. PATENT DOCUMENTS

| | | | |
|---|---|---|---|
| 3,879,751 | 4/1975 | Gimelli | 360/13 |
| 4,205,351 | 5/1980 | Michals | 360/4 |
| 4,439,798 | 3/1984 | Chvojcsek | 360/4 |
| 4,536,804 | 8/1985 | Kasubuchi et al. | 360/4 |
| 4,924,387 | 5/1990 | Jeppesen | 364/409 |
| 4,985,929 | 1/1991 | Tsuyama | 178/21 |

Primary Examiner—Robert J. Pascal
Assistant Examiner—Tan Dinh
Attorney, Agent, or Firm—David O'Reilly

[57] ABSTRACT

A stenotype recording system in which keystrokes and audio are simultaneously recorded and stored. Pointers created when operating the stenotype machine link the keystroke input with the audio recording for instantaneous playback during editing. Audio and keystroke input are stored in a mass storage medium for transfer to a computer for transcription. During editing any portions of the record can be instantaneously played back for correction.

21 Claims, 5 Drawing Sheets

| STROKE NUMBER | FIELD NO.1 (STENO) | FIELD NO. 2 POINTER (AUDIO FILE) | AUDIO |
|---|---|---|---|
| 100 | TPH | 190048 | IN |
| 101 | K O PL | 190188 | COM |
| 102 | P RA E | 190327 | PRE |
| 103 | H E PB S | 190492 | HENS |
| 104 | EU BL | 190936 | IBLE |
| 105 | TPH | 194231 | IN |
| 106 | T K E | 203231 | DE |
| 107 | TA EU LS | 203945 | TAILS |
| 108 | FPLT | 204501 | . |
| 109 | T H EU S | 212052 | THIS |

STENOTYPE MACHINE WITH LINKED AUDIO RECORDING

FIELD OF THE INVENTION

This invention relates to a stenotype machine that simultaneously records keystrokes and audio and more particularly relates to a stenotype machine that stores and, by time stamps, links the keyboard strokes with the recorded audio.

BACKGROUND OF THE INVENTION

Stenotype machines record testimony by coded keystrokes. The stenotype keystroke record is then transcribed into written text to provide a documented record of the testimony. Presently stenotype machines provide both a paper tape recording of the keystrokes and a duplicate in an electronic memory, such as a magnetic card, magnetic computer chip or 3½ inch magnetic disk. Stenotype machines currently record only alphanumeric characters as recorded by the operator. For a variety of reasons persons speaking are not always recorded entirely or recorded verbatim and strokes are missed. Presently stenotype machines also include digital recording of the keystrokes that can be transferred to a transcribing computer.

The transcribing computer has stored within it a primary personal dictionary of stenotype outlines and their English equivalents which, by computer program, translates to readable text the keystrokes made by the reporter.

In preparing to transcribe the information using the transcribing computer, the keystrokes are first loaded from the stenotype machine memory and stored in the transcribing computer. The next step is to create a dictionary somewhat like the primary personal dictionary, called a "job" dictionary, for jargon and proper names not stored in the reporter's primary personal dictionary in the transcribing computer.

The transcribing computer then translates the stenotype keystrokes into text for editing and printing a transcript of the testimony. However, in some cases there may be keystrokes that are not recognized as corresponding to anything in the primary personal dictionary or job dictionary. These areas are highlighted by the computer and are known as "untranslates." With the present external audio recording techniques the transcribing computer operator must search through an audio tape, if one is used, to try and find the area where the unrecognized keystrokes are and then make corrections. This is difficult and time consuming. If there is no audio recording, attempts must be made to insert the missing keystrokes and unrecognized keystrokes by context and interpretation.

If the keystrokes do not match a defined stenotype outline in the reporter's primary personal dictionary or job dictionary the keystroke is shown in the translated text as a stenotype keystroke, referred to as an untranslate, and is unintelligible to a person not familiar with stenotype. The context of the text will often suggest the word(s) represented by the poor stenotype keystroke or missing keystrokes. Often a word or a phrase in testimony can be of great significance and it is important the transcription be as accurate as possible.

There is a computerized system described in U.S. Pat. No. 4,924,387 issued Mar. 8, 1990 that attempts to solve the problem. In this expensive and complicated system keystrokes are recorded while a videotape is being made. In this system three pieces of equipment are required: a stenotype machine, a video camera, and a video recorder. The system includes time stamping to search the recording of the video and audio signals to find the closest current time of day signal. When in the editing mode using a computer, the system includes the ability to find the nearest time stamp and rewind or fast forward the videotape recorder to the closest point in time for playing back the video during editing.

Another system disclosed in U.S. Pat. No. 4,205,351 issued May 27, 1980 is for a stenotype machine that incorporates digital data recording on a magnetic tape medium. This system provides no means for recording audio or linking the audio to the stenotype machine strokes.

Other attempts at solving the problem of providing an accurate written record of testimony or proceedings involve using audio tape recording simultaneously but separate from and external to the stenotype machine. If there is any doubt about a portion of the record upon being transcribed, the reporter can play the audio recording in an attempt to clarify the record. However, this can prove difficult because searching through the audio tape must be done manually. This presents difficulties not only in locating the area of the tape but also in the simultaneous operation of the tape recorder and the transcribing computer. Additionally, maximum tape recording on cassettes is only four hours, which may require interruptions during testimony to change cassettes and may be inconvenient at times.

It is one object of the present invention to provide a system built into a stenotype machine for recording audio while at the same time recording keystrokes.

Yet another object of the present invention is to provide digital recording of stenotype machine keystrokes and audio recording that is simultaneously recorded, linked by time stamp and stored on magnetic media.

Yet another object of the present invention is to provide a stenotype machine that simultaneously records stenotype keystrokes and audio that can be played back without the need for a mechanical manual search function as currently required with an external audio tape recording device.

Yet another object of the present invention is to provide a stenotype machine with a built-in audio recorder and storage means that allows a reporter to instantly locate any desired portions of the transcript with reliability and relative precision.

Still another object of the present invention is to increase the efficiency of preparing transcripts of recorded testimony and which allows any portion of the proceedings, stenographically or orally, to be instantly accessed in any order without the need for separate or additional equipment to play back the audio, except for a speaker and/or headset.

Still another object of the present invention is to provide a synchronous steno/time stamp-audio recording system that can be adapted to any stenotype machine currently on the market.

Yet another object of the present invention is to provide a system built into a stenotype machine that simultaneously records stenotype keystrokes and audio in a manner that can be easily transferred to a computer for transcribing.

BRIEF DESCRIPTION OF THE INVENTION

The purpose of the present invention is to provide a stenotype device and system for simultaneously capturing and synchronously maintaining audio and steno-typed alphanumeric characters typed on a stenotype keyboard. The system provides within it a recording device to aid in transcribing uncertain, missing or erroneous keystrokes made during the recording of testimony.

The purposes of the present invention are achieved by incorporating a digital audio recording system into a conventional stenotype machine that also records keystrokes for computer-aided transcription of stenotype keystrokes. The system includes an audio recorder that records proceedings onto a magnetic medium, such as a disk, tape, card, chip or other storage media, including static, dynamic, bubble or other memory types. The recording of the audio and stenotype keystrokes are independent of each other; that is, the audio recording is not dependent upon the operation of the stenotype keyboard and, conversely, the operation of the stenotype keyboard can be accomplished independent of audio recording. When testimony is recorded on a stenotype machine with the audio device in operation the stenotype keystrokes are recorded in digital form and are synchronously linked to the audio on a relative time basis. Both the digitally encoded stenotype keystrokes and recorded audio are simultaneously stored onto the aforementioned memory storage devices.

Stenotype keystrokes are recorded simultaneously on a paper tape to allow verbal readback by the reporter and on a separate digital recording medium and stored on magnetic storage. The microphone on the stenotype machine records the audio. A program, activated when the audio recording device is first energized, returns a time stamp to the corresponding stenotype keystroke and links each keystroke to the audio as a keystroke is recorded and later creates pointers used in playback while editing. Thus the stenotype keystroke files are linked by time to the recorded audio file, which linkage enables playback on the transcribing computer.

Preferably, the audio recording system within the stenotype machine is separately energized from the stenotype keystroke recording system so the recording can be turned off during discussions held off the record. Such discussions not recorded by keystrokes on the stenotype machine will not cause any asynchronous errors because time stamps are not created when keystrokes are not recorded even if the audio is being recorded. Thus, while editing, the edit cursor of the transcribing computer can be positioned at any translated word or untranslated stenotype keystroke to obtain an audio playback of the actual conversation which occurred during the recording of testimony. The stenotype machine operator thus has the option of turning on and off the audio recording device while still using the keystrokes to record testimony, and because of the linking of the stenotype keystrokes with audio, which occurs when time stamps are created upon turning on the audio and commencing keystrokes, the playback will not become asynchronous.

The stenotype machine system includes a central processing unit and memory that, when energized, installs a program allowing the system to simultaneously record keystrokes and audio. Indicator lights show power on and audio is recording. The audio recording device is activated by a separate switch or could be activated by use of an infrequently used stenotype keystroke. Thus the system allows the audio recording to be turned on or off when there are discussions off the record or when the reporter has no need for this feature. Thus three modes of operation are provided: stenographic keystrokes and audio may be recorded together, or each may be recorded independent of the other.

The recorded stenographic time-stamped keystrokes and audio are then transferred to a transcribing computer for preparing a transcript of the testimony. Transfer can be by removable disk, removable tape, removable card that will be inserted in the computer drive or tape reader and then downloaded, or as in the case of a chip, transfer can be by direct cable connection. All that is required is that the stenotyped keystrokes and audio be recorded on storage media and linked by time stamps which create pointers necessary for audio playback.

Once the files are loaded into the transcribing computer, a job dictionary is created to aid in translating the stenotype keystrokes. The computer then, by means of the software program installed, translates the testimony using the primary personal dictionary and job dictionary. The reporter then can edit the translated record to determine any areas of uncertainty or missing keystrokes. At a point on the display indicating uncertainty in transcribing the testimony, the operator can play back the audio by entering a selected keystroke on the computer. The audio for that portion of the record is instantly replayed and corrections made immediately by virtue of the synchronization of the keystrokes and audio. No manual searching is required and no separate audio playback equipment other than a speaker is needed.

Current external recording methods require time-consuming searching and additional equipment. In the present invention any segment of the audio may be played back and at the editing operator's option an audio review of any portion of the recorded testimony can be made. The process of playing back the recorded audio of any portion of the proceedings represented by the stenotype keystrokes or translation is instantaneous, thereby increasing the efficiency with which transcripts can be prepared. Any portion of the audio testimony can be instantly accessed in any order without the need for separate or additional equipment to play back the audio.

The above and other features of this invention will be fully understood from the following detailed description and the accompanying drawings, in which:

DETAILED DESCRIPTION OF THE INVENTION

A stenotype machine 10, shown in FIG. 1, has a keyboard comprised of multiple keys 12, a paper tray 14, and an LCD display 16 which will be described in greater detail hereinafter. Battery 54, or AC power cord 18, supplies power to the stenotype machine 10. Indicating lights 20 and 22 show when the power has been applied and when the audio device of the stenotype machine is recording, as will also be described in greater detail hereinafter. Stenotype device 10 is a recording device for simultaneously capturing and maintaining audio input with stenotype alphanumeric characters typed on stenotype keyboard 12. Keystrokes on stenotype keyboard 12 are linked in real time for reference points to the audio data. Synchronism is accomplished by the computer's ability to perform two functions at the same time, or multi-task, that is, record time-stamped keystroke input from stenotype keyboard 12 and audio input from an analog-to-digital converter. The linking provides instantaneous playback of the audio file at the location of alphanumeric keystrokes as the cursor of an editing computer is maneuvered within the file, as will be described in greater detail hereinafter.

Stenotype machine 10 of the present invention employs an analog-to-digital data recorder. This device simultaneously records analog input, converting it to digital values which are linked to the keystrokes made on stenotype keyboard 12, thus providing a link between the alphanumeric and audio record. This aids a reporter in editing and correcting the transcript of testimony or proceedings. Conventional stenotype machines record only alphanumeric keystroke combinations as recorded by the operator. Stenotype machine 10 of the present invention records alphanumeric combinations, i.e., keystrokes, and links them to an audio file in a database-type format. The stenotype keystroke database has two fields, alphanumeric keystrokes and time stamps associated with each keystroke showing relative time from energizing the audio. The computer program determines and updates the time from initial energizing of audio, whether at beginning of file or subsequently. The pointers thus created are later used for instantaneous playback at any location of the audio portion of a data file represented by the alphanumeric key combinations that were struck.

Figures 1, 2:
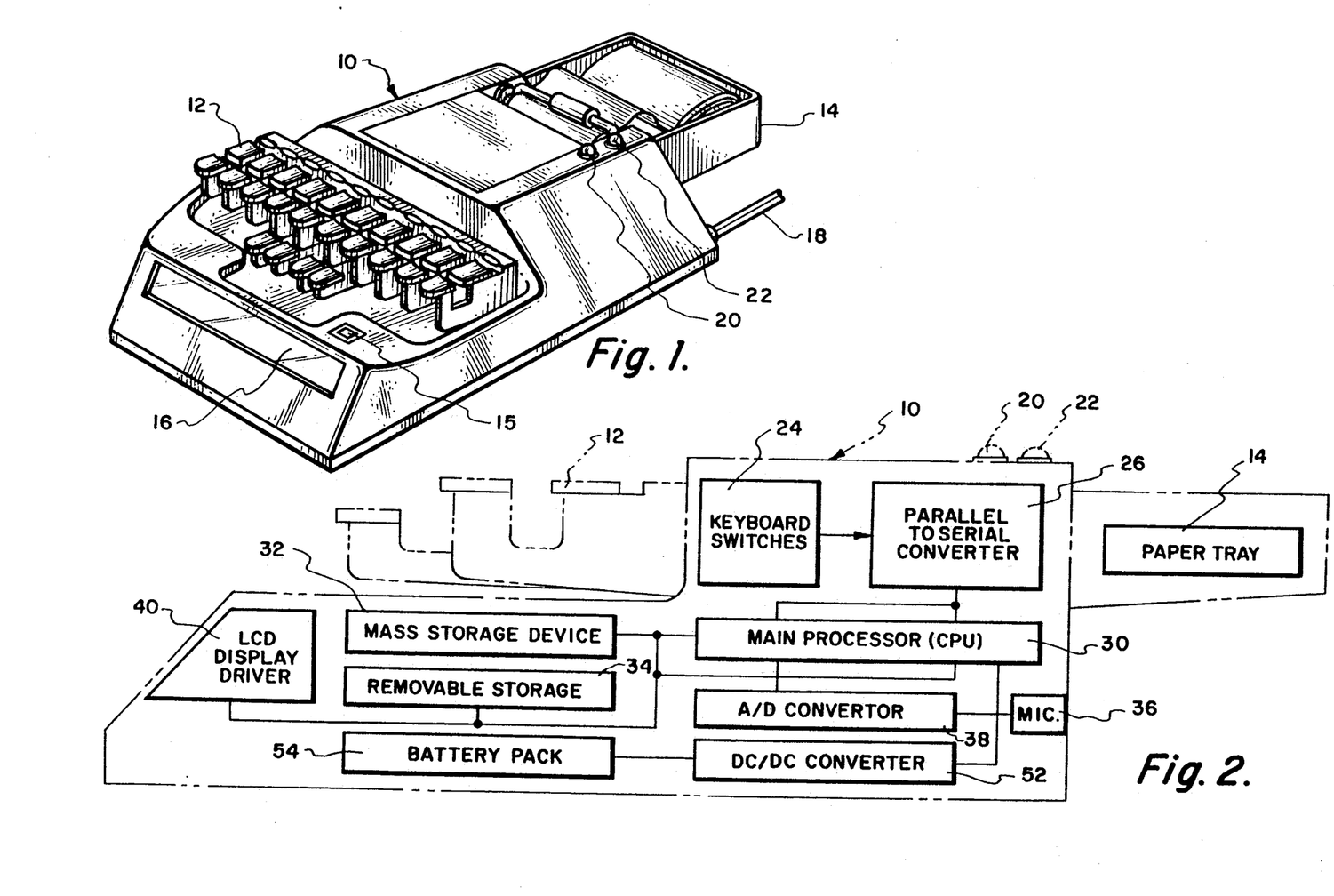
FIG. 1 is a perspective view of a stenotype machine simultaneously recording and storing keystrokes and audio input.
FIG. 2 is a diagrammatic view of a stenotype machine according to FIG. 1 illustrating the components built into the machine in block diagram form.

The interior of the stenotype machine housing is illustrated generally in the block diagram of FIG. 2 in which the housing is shown in phantom. When a key on stenotype keyboard 12 is struck it closes one of the keyboard switches 24 connected by a ribbon cable to a parallel-to-serial converter 26, which in turn is connected through a 5-pin ribbon cable to the keyboard buffer of the central processor or computer 30. Central processor 30 can be any suitable computer processor, such as an Intel 80386 or the like. Input from operation of keyboard switches 24 is converted to serial output by parallel-to-serial converter 26. Output is then stored on a mass storage device, such as a hard disk 32, as well as on a backup magnetic storage 34, such as a floppy disk unit.

Audio input is provided through microphone 36 and analog-to-digital converter 38 to CPU 30 for storage in mass storage device 32. Liquid crystal display 40 (LCD) provides an indication of any error conditions or any functions related to computer applications including telecommunications, on-off switching of features, simple malfunction reporting and general status regarding free space, low battery, et cetera.

A program for operating the system is also stored in mass storage device 32 and is loaded into memory in central processor 30 upon energizing. The program shown in FIG. 3 controls the operation and storage of keystrokes entered through keyboard 12 and keyboard switches 24 and audio recorded by microphone 36 and analog-to-digital converter 38.

Figure 3:
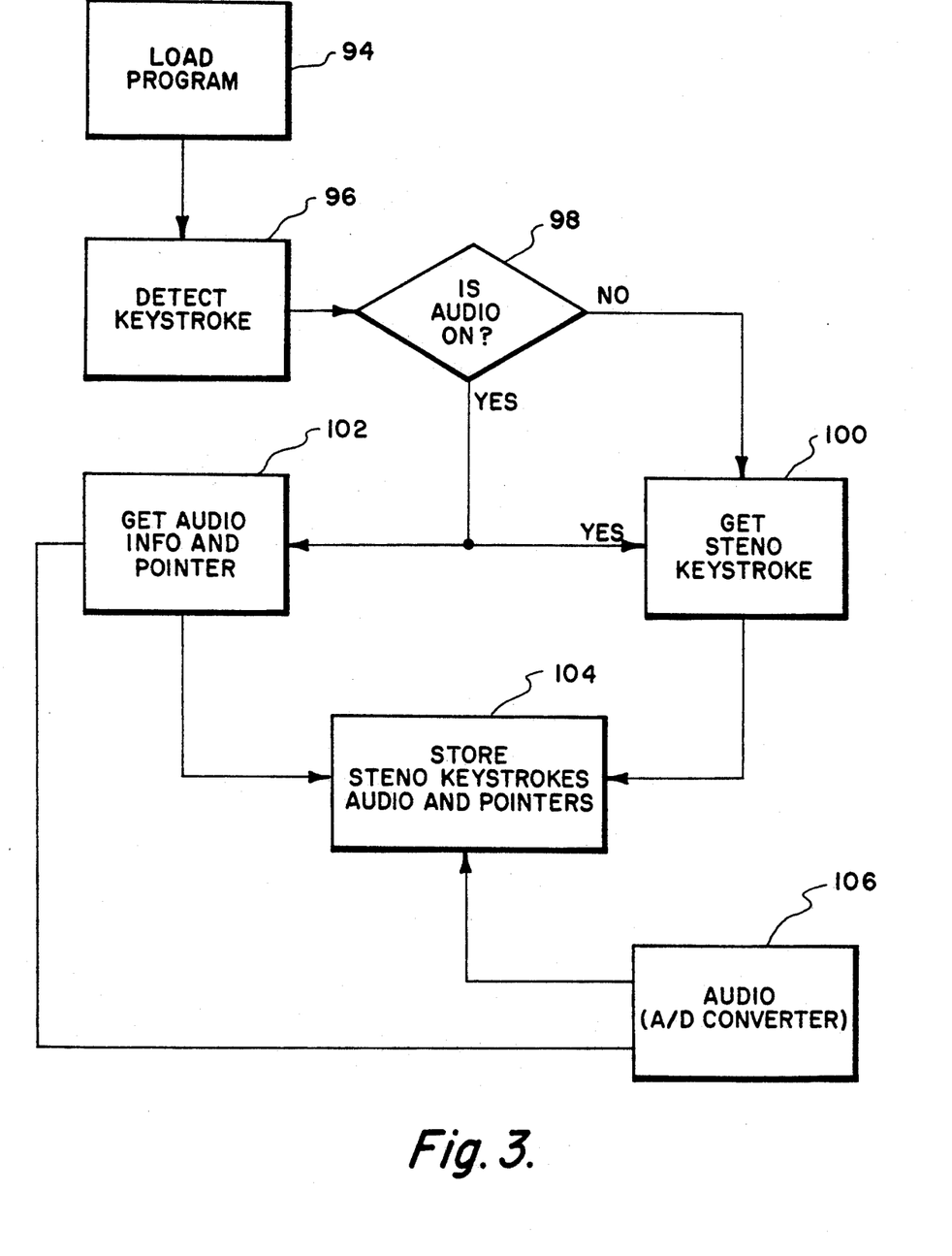
FIG. 3 is a block diagram of the program for creating pointers.

As shown in FIG. 3, the program for creating pointers is loaded by Load Program 94 into main processor memory upon "booting" or startup of the stenotype machine. This program first determines by the subroutine Detect Keystroke 96 if there is a keystroke waiting to be captured. If there is no keystroke to be captured, the program loops or polls until a keystroke is made. Once a keystroke is available to be captured and the keystroke detected by Detect Keystroke 96, the program then determines by subroutine Audio On 98 whether the audio device has been energized. If a keystroke is detected and the audio recording device is on, subroutine Get Audio Pointer 102 gets a pointer from the audio device (i.e. A/D converter 38) as it is being recorded by the audio recording device. The stenotype keystroke with pointer and audio 106 are then written onto mass storage media 104.

If the program detects a keystroke waiting to be captured and the audio device has not been turned on, subroutine Get Steno Keystroke 100 captures that keystroke, and only that keystroke is written onto the mass storage media Store Steno Keystrokes, Audio & Pointers 104. If the audio device is on, Audio (A/D converter) 106 continuously writes audio input onto mass storage media. Subroutine Get Audio Info & Pointer 102 in FIG. 3 reports analog/digital converter conditions, such as time and status, (i.e., whether recording audio). This informs the operator of the operational status, such as overload, overrun of audio buffer, malfunctions, errors and time.

Indicator light 20 will indicate when power is applied to stenotype machine 10. Indicator light 22 is illuminated when the audio recording device is energized. The audio recording device is energized either by a switch 15 or by a keystroke combination on keyboard 12. A keystroke combination that is rarely or never used may be selected for activating or deactivating the audio recording through microphone 36 and analog-to-digital converter 38.

A key feature of the system is the linking of the keystroke input through keyboard 12 and the audio input recorded by microphone 36. Both inputs are recorded simultaneously and stored in mass storage device 32 and linked by a pointer generated by the program loaded into main processor memory when power is applied to the system.

Figure 4:
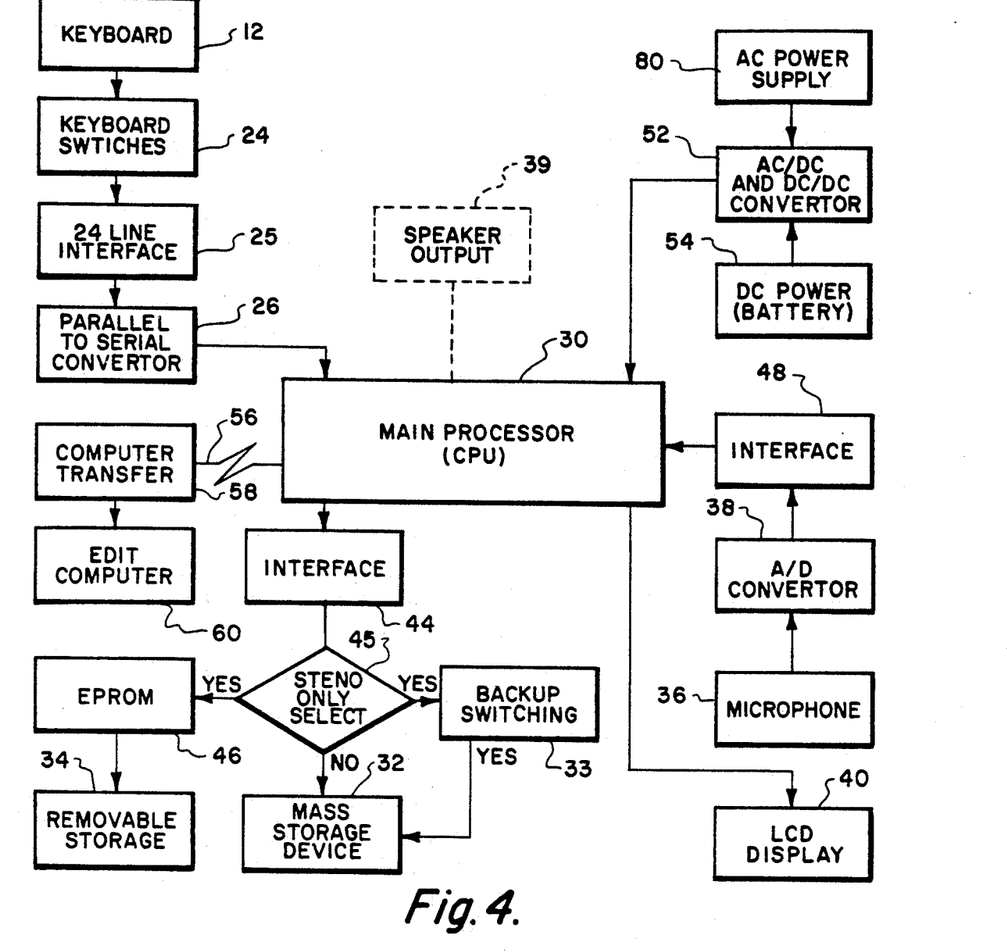
FIG. 4 is a block diagram of the system for simultaneously recording stenographic keystrokes and audio.

The operation of the stenotype machine 10 is illustrated in the block diagram in FIG. 4. At power up the operating program is loaded from mass storage 32 into main processor memory for creating the keystroke file and the audio file. Keyboard 12 provides input through keyboard switches 24 and twenty-four line interface 25 and parallel-to-serial converter 26, which is connected to main processor 30. This main processor can be any computer processor such as an Intel 80386 or compatible hardware.

Parallel-to-serial converter 26 converts the keystroke information received from interface 25 to keyboard output for processing by main processor (CPU) 30. The keystroke output from main processor 30 is fed through interface 44 to a steno only select 45 that indicates whether the output is either keystrokes only or keystrokes and audio. If the output is both keystrokes and audio, it is stored in mass storage device 32. Backup steno only switching device 33 writes a duplicate of the stenotype keystrokes to mass storage. If the output is keystrokes only, that is, the audio is turned off, the output is written on an erasable programmable read only memory 46 and also written on a removable storage device such as a floppy disk device 34.

Audio recording is started by a selected keystroke combination on keyboard 12, or by a separate switch 15, is converted to digital data by analog-to-digital converter 38 and fed to main processor 30 by interface 48. Keystrokes on keyboard 12 are linked to the audio input from microphone 36 by the program loaded into main processor memory at startup when power is applied from battery 54 or from AC power supply 50 through DC converter 52. The main power source, battery 54, also powers LCD display driver 40.

Figure 5:
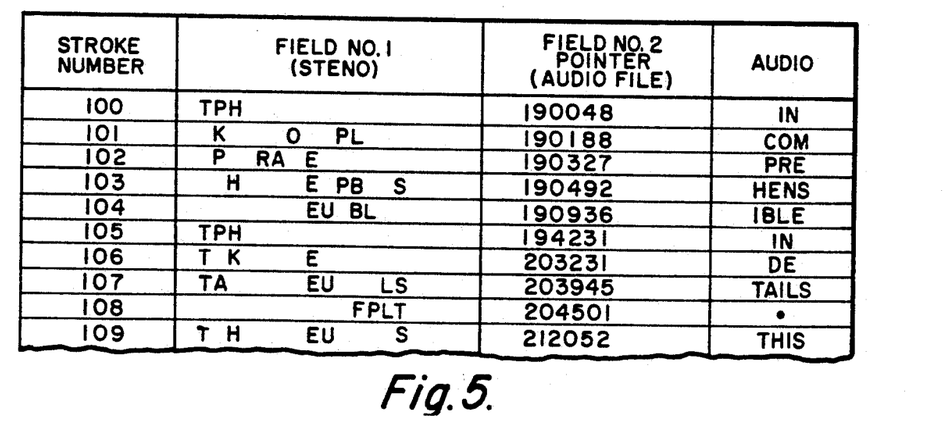
FIG. 5 is a table showing linked steno and audio.

Linkage of the keystroke combinations with the audio is illustrated in the table shown in FIG. 5. The keystrokes are shown as numbered from 100 for convenience. As described previously, keystrokes on keyboard 12 create a keystroke data file that has field number 1 for the particular keystroke combination and field number 2 for pointers, such as time stamps, generated by the program stored in memory. The table shows the keystrokes and time stamps for the word "incomprehensible." For the syllable "in" the keystroke would be {TPH/} and pointer 190048 would be created linking this keystroke to the first syllable in this word. This number represents a digital address linking field number 1, the stenotype keystrokes, with the recorded audio (i.e. "points" to the location where this portion of the audio is recorded). The linking pointer can be either a time stamp or file size indicator. The time stamp denotes the period of time from energizing the audio device.

When the testimony is completed, the keystroke and audio files are transferred to a transcribing computer. Mass storage device 32 can be a large hard drive, such as a 200-megabyte drive, which would store up to sixteen hours of stenotype keystrokes and audio recording with current configuration. In most cases this would be more than adequate. Alternatively, the mass storage device can be a removable hard drive or disk for direct transfer to the transcribing computer.

Preferably, they will be built-in hard storage disks and be connected to a transcribing computer by a cable, indicated at 56. Cable 56 connects stenotype machine 10 through transfer or interface 58 to transcribing/edit computer 60. Once loaded in transcribing computer 60 the conversion of keystrokes to text, also referred to as translating or transcribing, can begin.

The linking of keystrokes on stenotype machine 10 is performed when the audio recording feature is turned on as determined by the operator at the power-up. The audio recording is turned on either by external switch 15 or a keystroke combination on stenotype keyboard 12. A program is loaded from mass storage device 32 into main processor memory which includes a set-up routine that creates a file for keystrokes with corresponding pointers and audio recording. Each keystroke is also simultaneously recorded on paper in paper tray 14.

Figure 6:
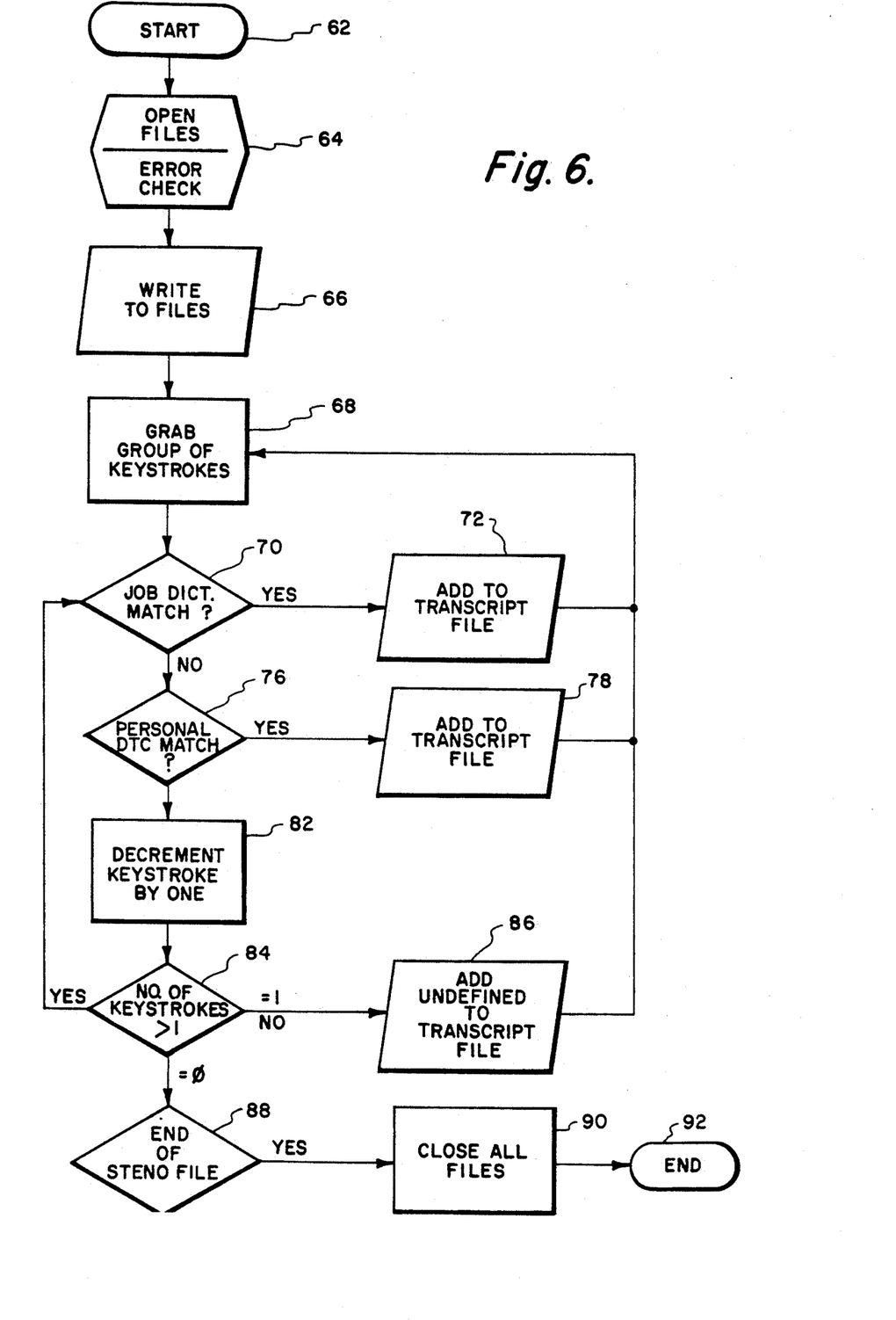
FIG. 6 is a flow diagram of the computer program for translating the recorded stenotype keystrokes.

Start 62 is a matter of applying power or turning the stenotype machine on. When the stenotype machine is turned on or "booted" a program is loaded into main processor memory and a diagnostic routine is run to test the hardware items in stenotype machine 10. All files and buffers related to audio and keystroke capture and linkage are created. By "created" is meant that empty storage areas are set aside for holding voice data in random access memory and on the storage device. Stenotype files held both in main processor memory and storage device 32 are also set up. All operations to link the keystroke data with audio recording are ready for input.

Three bytes, which comprise one stenotype keystroke, are retrieved from the keyboard buffer in the stenotype machine. This step involves polling the buffer for characters which are retrieved for storage. Each byte of the three bytes holds a portion of a keystroke. The three bytes with pointer are appended to the keystroke file and the program is ready for the next file event and keystroke. A keystroke record is written every time the keyboard is struck. This program also writes to a corresponding field the relative time stamp or file length at the moment the keyboard is struck. The keystroke field and relative time stamp or file length are both established and appended to the open file to provide a direct link to the audio file.

Subroutine Get Audio Info & Pointer 102 in FIG. 3 reports analog/digital converter conditions, such as time and status, i.e., whether recording audio. This informs the operator of operational status, such as overload, overrun of audio buffer, malfunctions, errors and time.

A time stamp created by the program in the stenotype machine 10 points to the location in the file where the corresponding audio input is recorded. This time stamp provides the ability to play back recorded information located in proximity to the particular keystroke. When a reporter is editing a transcript on the transcribing computer screen, if there is no match with data in a job dictionary or primary personal dictionary, the operator can then instantaneously play back the particular audio recorded at those keystrokes. This allows the operator or reporter to manually insert from the audio recording the word(s) which do(es) not have corresponding entry (entries) in the dictionaries.

The file translation program is illustrated in the flow diagram of FIG. 6. At Start 62 the computer is booted and the files containing the keystroke data and audio recording data are loaded. The program then opens the files for the keystrokes, page format, etc. At this time all memory for translating the file is allocated. Subroutine Write to Files 66 then writes a header to the transcript file. Subroutine Grab Group of Keystrokes 68, then grabs a group of strokes from the stenotype keystroke file and gets the length of strokes. The program is set to grab ten records of the steno file, which consists of keystrokes and time stamps. The keystrokes are then fed to Job Dictionary Match subroutine 70 for determining if there is a job dictionary match, that is, is there anything in the job dictionary that matches these keystrokes that can be written into the transcript. If the answer is yes, subroutine Add to Transcript File 72 writes the text and related data to the transcript file. If there is no match in the job dictionary, subroutine Personal Dictionary Match 76 then checks to see if there is a match in the primary personal dictionary. If there is a match, subroutine Add to Transcript 78 writes the text and related data to the transcript file.

Decrement keystroke subroutine 82 then decrements the number of keystrokes recorded by one keystroke. Subroutine Keystrokes Left >1 84 then determines if there are any more keystrokes to be translated. Subroutine Add Undefined to Transcript File 86 detects when no keystrokes are left and places the last keystroke of the prior series of n keystrokes in the transcript file as undefined and appends it to the next series of keystrokes up to n. When there are no keystrokes left, the program passes through subroutine End of Steno File 88 which passes the program to the subroutine Close All Files 90 and the program is terminated at End 92.

Figure 7:
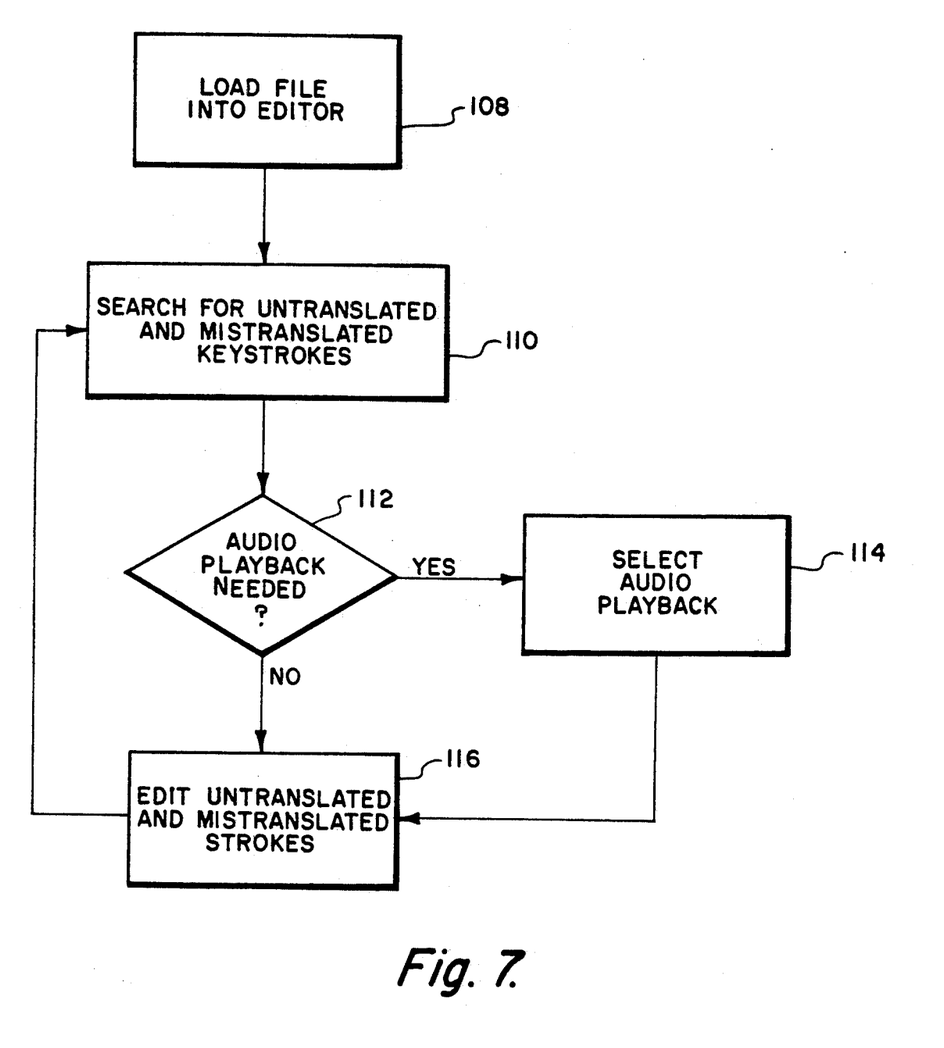
FIG. 7 is a block diagram of the program for editing and playing back a translated file.

As shown in FIG. 7, the program for editing is loaded into the transcribing computer. The translated file is loaded by subroutine Load File into Editor 108 for editing. Subroutine Search for Untranslated and Mistranslated Keystrokes 110 searches for untranslated or mistranslated stenotype keystrokes for which there was no English equivalent in either the primary personal dictionary or the job dictionary. If there is uncertainty at Audio Playback Needed subroutine 112, the operator may select subroutine Audio Playback 114. Edit subroutine 116 allows the operator to make a correction of the untranslated and mistranslated text. If there is no uncertainty, the operator proceeds to Edit subroutine 116 and corrects the text without the aid of audio playback. The next untranslated text is searched, located, played back, if needed, and corrected.

The most frequent use of audio playback is occasioned if during the translating process there was no match found in the job dictionary or primary personal dictionary routines during the translation subroutines. The reporter or operator has the option of playing back the audio at any time as shown in the editing program of FIG. 7. A preselected keystroke will then instantaneously play back the particular audio portion. This system will give the reporter or operator the ability to double check the accuracy of the written transcription of testimony or proceedings.

Thus there has been disclosed a stenotype machine that simultaneously records keystroke input and voice recording which are linked for later playback to facilitate transcription. Each keystroke is linked by a pointer to a particular location in the audio recording so that the audio recording can be instantaneously played back to correct the file during transcript preparation.

This invention is not to be limited by the embodiment in the drawings and described in the description which is given by way of example and not of limitation, but only in accordance with the scope of the appended claims.

What is claimed is:

1. A stenotype recording system comprising;
  a keyboard for entering coded keystroke combinations to record testimony;
  keyboard stroke storage means for storing said coded keystroke combinations;
  audio recording means for recording the audio portion of the testimony;
  audio storage means for storing said audio recording;
  linking means for linking each stored coded keystroke combination with stored recorded audio;
  whereby the recorded audio representing a particular coded keystroke combination is instantaneously played back during the transcription of said testimony to facilitate transcription.

2. The system according to claim 1 in which said linking means comprises means creating a pointer to point to the location of the stored audio recording representing a stored keystroke combination.

3. The system according to claim 2 in which said audio recording means comprises digital audio recording means.

4. The system according to claim 3 in which said digital audio recording means comprises a microphone and analog-to-digital converting means for converting the output of said microphone to digital output.

5. The system according to claim 3 including means for selectively starting and stopping said audio recording means whereby audio can be recorded, or not recorded, separate from said coded keystroke combinations.

6. The system according to claim 5 including indicating means indicating when audio is being recorded.

7. The system according to claim 1 in which said keystroke storage means and said audio storage means comprises a magnetic mass storage means.

8. The system according to claim 7 in which said keystroke storage means includes a second magnetic storage means for recording keystroke combinations only.

9. The system according to claim 5 in which said means for selectively starting and stopping said audio recording means comprises switch means for selectively stopping said recording means whereby said audio recording means may be stopped during off-the-record discussions.

10. The system according to claim 7 indicating transfer means for transferring stored keystroke combinations and stored audio recording to a transcribing computer.

11. The system according to claim 10 in which said transfer means comprises cable means for connecting said stenotype recording system to a transcribing computer.

12. The system according to claim 11 in which said transcribing computer includes translating means translating said stored coded keystroke combinations to text, and flagging means for flagging unknown keystroke combinations.

13. The system according to claim 12 in which said transcribing computer includes playback means for playing back the recorded audio corresponding to any coded keystroke combination whereby accurate transcription of any unknown keystroke combination can be achieved by playing back said audio recording.

14. The system according to claim 7 in which said mass magnetic storage means comprises a magnetic hard disk having at least 200 megabytes of storage.

15. The system according to claim 7 in which said mass magnetic storage means comprises removable mass storage means.

16. The system according to claim 10 in which said transfer means comprises removable mass magnetic storage means whereby said removable mass magnetic storage means can be removed from said stenotype recording system and transferred to said transcribing computer.

17. The system according to claim 1 in which said keyboard stroke storage means and said audio recording means comprises recording and storage means that simultaneously records and stores said keystroke combinations with said audio.

18. The system according to claim 9 in which said switch means comprises a keyboard switch.

19. The system according to claim 18 in which said keyboard switch comprises an unused keyboard combination.

20. The system according to claim 1 including display means for displaying operating conditions of said stenotype recording system.

21. The system according to claim 20 in which said display means comprises a liquid crystal display.

* * * * *